United States Patent [19]

Cutburth

[11] Patent Number: 4,925,286
[45] Date of Patent: May 15, 1990

[54] THREE-POINT SPHERICAL MIRROR MOUNT

[75] Inventor: Ronald W. Cutburth, Bulls Gap, Tenn.

[73] Assignee: The United States of America as represented by the United States Department of Energy, Washington, D.C.

[21] Appl. No.: 8,120

[22] Filed: Jan. 23, 1987

Related U.S. Application Data

[63] Continuation of Ser. No. 798,159, Nov. 15, 1985, abandoned, which is a continuation of Ser. No. 573,251, Jan. 23, 1984, abandoned.

[51] Int. Cl.$^5$ .......................... A47G 1/24; B60R 1/02; H01S 3/08; G02B 7/00
[52] U.S. Cl. ................................... 350/632; 248/485; 350/639; 372/107
[58] Field of Search ............... 350/600, 631, 632, 639; 372/100.34, 107; 248/474, 485

[56] References Cited

U.S. PATENT DOCUMENTS

| Re. 31,279 | 6/1983 | Mefferd et al. ........................ 372/34 |
| 3,357,268 | 12/1967 | Richter et al. ...................... 372/107 |
| 3,368,781 | 2/1968 | Altoz ................................... 248/481 |
| 3,588,052 | 6/1971 | Gersman et al. . |
| 3,588,232 | 6/1971 | Mostel ................................. 350/633 |
| 3,917,385 | 11/1975 | Caswell ............................... 248/485 |

FOREIGN PATENT DOCUMENTS

| 0041538 | 3/1977 | Japan ................................... 350/633 |
| 0108400 | 9/1978 | Japan ................................... 350/634 |

Primary Examiner—Stanley D. Miller
Attorney, Agent, or Firm—Miguel A. Valdes; Roger S. Gaither; William R. Moser

[57] ABSTRACT

A three-point spherical mirror mount for use with lasers is disclosed. The improved mirror mount is adapted to provide a pivot ring having an outer surface with at least three spaced apart mating points to engage an inner spherical surface of a support housing.

2 Claims, 3 Drawing Sheets

THREE-POINT SPHERICAL MIRROR MOUNT

FIELD OF THE INVENTION

The United States Government has rights in this invention pursuant to Contract No. W-7405-ENG-48 between the United States Department of Energy and the University of California for operation under Lawrence Livermore National Laboratory.

This application is a continuation of Ser. No. 798,159 filed Nov. 15, 1985, and now abandoned, which is a continuation of Ser. No. 573,251 filed Jan. 23, 1984, and not abandoned.

BACKGROUND OF THE INVENTION

The present invention relates to a three-point spherical mirror mount for use with laser technology. As is known in the laser art, it is extremely critical and important for any associated mirrors to be aligned in proper orientation. It is critical that the alignment be maintained with high precision because any minor deviation can seriously affect the laser beam propagation.

Numerous prior art approaches are known, most of which tend to be, in general, an alignment of a spherical housing surface with another spherical inner ring surface. When properly aligned, such prior art devices can provide suitable orientation for positioning of a mirror.

A problem with such an approach is that the two spherical surfaces to be "mated" must be machined with extremely high precision in order to provide the necessary stability. In essence, an infinite number of points must be "mated" together on the two spherical surfaces and any minor deviation can affect the overall orientation, and consequently the precision of the mirror mount. Moreover, the prior art approach with matching two spherical surfaces is difficult to achieve in an economical fashion. As indicated above, high precision is necessary and desired.

SUMMARY OF THE INVENTION

It is an object of the present invention to provide an improved spherical mirror mount for use with laser technology.

Another object is to provide a spherical mirror mount which is economical and simple to implement.

Briefly, the spherical mirror mount includes a spherical housing, and a pivot ring having an outer surface for supporting a mirror. The outer surface has at least three spaced apart mating points formed thereon and the spherical housing has an inner spherical surface which is adapted to engage the three spaced apart mating points of the pivot ring.

In a preferred embodiment, the mating points can be formed by ball bearings so that the spherical housing can provide the necessary support function at the three spaced apart mating points while at the same time significantly reducing the required precision of prior art approaches.

Additional objects, advantages and novel features of the present invention will be set forth in part in the description which follows, and in part will become apparent to those skilled in the art upon examination of the following, or may be learned by practice of the invention. The objects, features and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate a preferred embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 2:
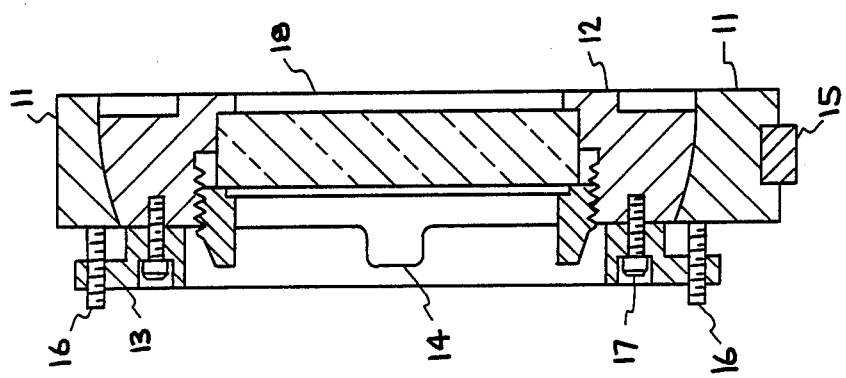
FIG. 2 is a cross-sectional view of the mirror mount depicted in FIG. 1.
Figure 1:
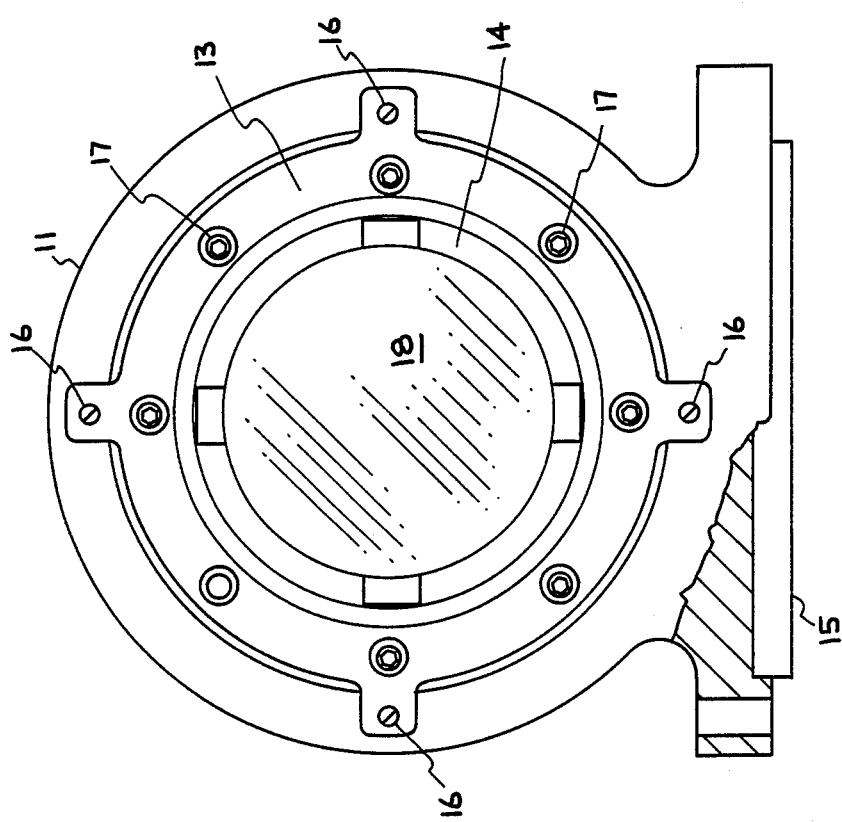
FIG. 1 is a frontal view of a mirror mount for use in laser technology.

Referring now to the drawings, FIG. 1 depicts a frontal view of a suitable mirror mount for use with laser technology, and FIG. 2 depicts a side cross-sectional view of the mirror mount of FIG. 1.

The mirror mount illustrated in FIGS. 1 and 2 will be described briefly to illustrate the problems in the prior art.

The mirror mount of FIGS. 1 and 2 is supported by a base 11 which supports a pivot ring 12, as illustrated in FIG. 2. An adjustment ring 13 as seen in FIG. 1 is affixed to pivot ring 12 via screws 17, as illustrated in FIGS. 1 and 2.

A clamp nut 14 is illustrated in FIG. 2 for supporting a mirror 18, in pivot ring 12, which is screw threaded.

Set screws 16 are shown in FIGS. 1 and 2 which, with suitable adjustment, will provide orientation in a proper alignment for mirror 18 by simple adjustment of hand wrenches (not shown). A key support 15 is shown engaged in FIGS. 1 and 2 to the base 11.

The mirror mount illustrated in FIGS. 1 and 2, although providing suitable orientation, nevertheless can only provide such an orientation with extremely high precision machining. As illustrated clearly in FIG. 2, the orientation of spherical base 11 and pivot ring 12 can only be achieved with extremely high precision machining. The mating of the outer surface of pivot ring 12 and the inner surface of base 11 are two curved mating surfaces which are spherical. To provide desired alignment, an infinite number of points on each of the respective spherical surfaces must engage between pivot ring 12 and base 11. Consequently, it can be seen that to achieve suitable orientation with the mirror mount depicted in FIGS. 1 and 2, extremely high precision is required of the pivot ring 12 and base 11.

Figure 4:
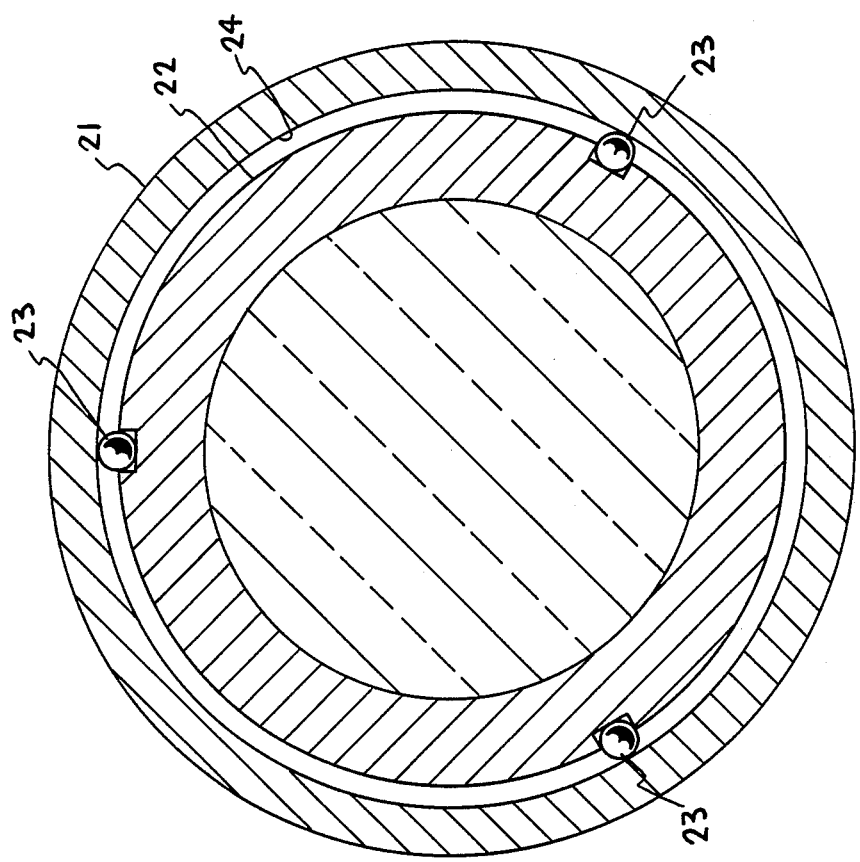
FIG. 4 depicts a schematic frontal view of the pivot ring of the mirror mount of FIG. 3.
Figure 3:
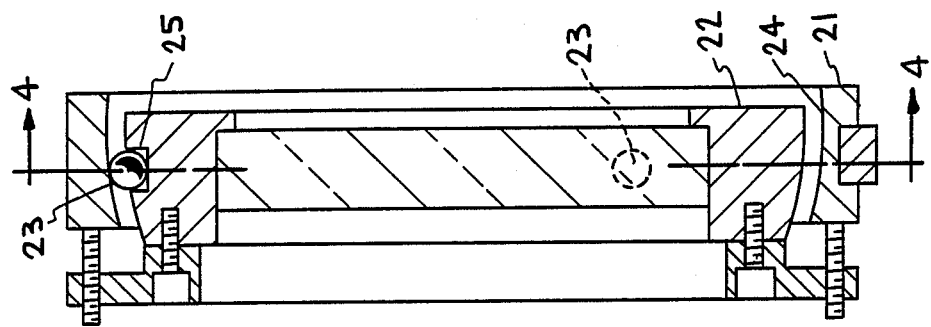
FIG. 3 depicts a cross-sectional view of an improved mirror mount according to the present invention.

Referring now to FIGS. 3 and 4, a modification to the two spherical surfaces is depicted. In particular, FIG. 3 depicts a spherical mount having a base 21 which has a spherical inner or surface face 24.

Pivot ring 22 illustrated in FIG. 3 includes ball bearings 23 oriented in holes 25. Ball bearings 23 form mating points to engage the spherical base 21 at three spaced apart points. Alternatively, steel buttons could be utilized rather than ball bearings.

In a preferred embodiment, the present invention has spaced apart mating points which are equidistant to one another, as illustrated in FIG. 4.

As can be seen in FIGS. 3 and 4, the improved spherical mirror mount provides at least three spaced apart mating points between inner ring 22 and outer spherical support base 21.

Figure 5:
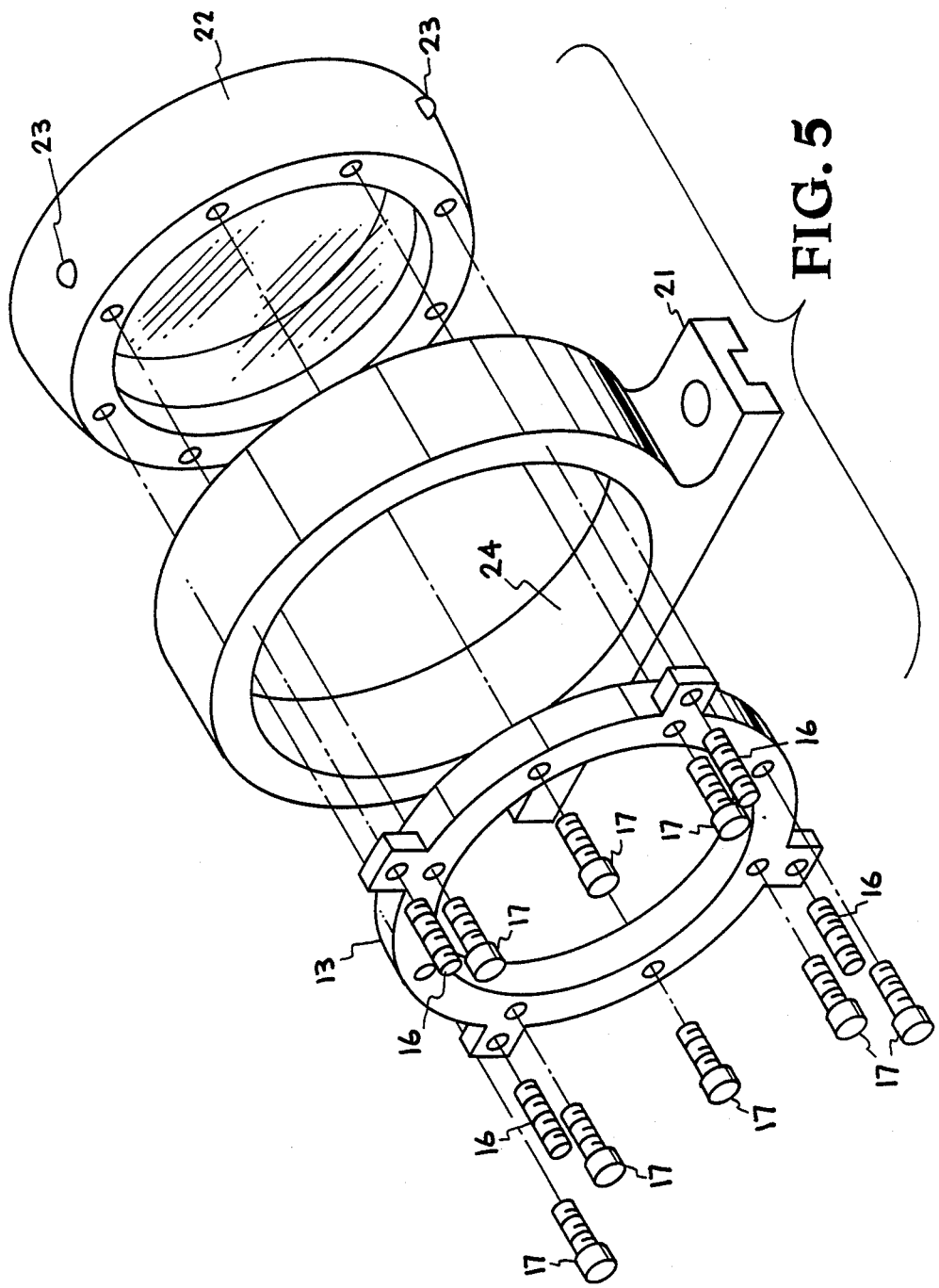
FIG. 5 depicts an exploded, perspective view of the improved mirror mount according to the present invention.

Referring now to FIG. 5, an exploded perspective view of the present invention is depicted. In FIG. 5, the base 21 has a spherical inner face 24 which engage the ball bearings 23 of pivot ring 22. The adjustment ring 13 can be affixed to pivot ring 22 via screws 17. Adjustment screws 16 provide suitable adjustment for proper alignment.

An advantage of the improved mirror mount is that the machining of the necessary components need not be as precise as with prior art approaches. Because only three mating points are necessary, it is quite evident that the necessary machining of the pivot ring and spherical base can be achieved with much less cost than prior art approaches.

In a preferred embodiment, the components of the improved mirror mount are typically made of carbon steel or heat treated steels. With the specific orientation depicted in FIG. 4, the three mating points spaced apart at equidistant points provides for a high precision instrument capability while yet allowing for a much cheaper machining of the components.

The foregoing description of the preferred embodiment of the invention is presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. For example, because of the high precision capability of the present invention, it is suitable for use with all types of test equipment requiring such type of precision capability. It is intended that the scope of the invention be defined only by the claims appended hereto.

What is claimed is:

1. A spherical mirror mount for supporting a mirror comprising a spherical housing, a pivot ring for supporting the mirror, said pivot ring having a substantially spherical outer peripheral surface, said outer surface being provided with a number of spaced apart mating members formed thereon where said number is at least three, adjustment ring means affixed to said pivot ring and to said spherical housing to enable proper alignment of said pivot ring and said mirror, said spherical housing having an inner substantially spherical surface adapted to engage each of said spaced apart mating members for mating said spherical housing to said pivot ring so as to establish at least three spaced apart locations of engagement therewith to thereby facilitate proper alignment between said housing and said pivot ring wherein said spaced apart mating members are spaced equidistantly from one another, and wherein said mating members are formed by ball bearings.

2. A spherical mirror mount for supporting a mirror comprising a spherical housing, a pivot ring for supporting the mirror, said pivot ring having a substantially spherical outer peripheral surface, said outer surface being provided with a number of spaced apart mating members formed thereon where said number is at least three, adjustment ring means affixed to said pivot ring and to said spherical housing to enable proper alignment of said pivot ring and said mirror, said spherical housing having an inner substantially spherical surface adapted to engage each of said spaced apart mating members for mating said spherical housing to said pivot ring so as to establish at least three spaced apart locations of engagement therewith to thereby facilitate proper alignment between said housing and said pivot ring wherein said spaced apart mating members are spaced equidistantly from one another, and wherein said mating members are formed by steel buttons.

* * * * *